United States Patent

[11] 3,582,112

| [72] | Inventor | Francisco A. Pico<br>Donato Guerro 2210, Chihuahua,<br>Chihuahua, Mexico |
|---|---|---|
| [21] | Appl. No. | 815,778 |
| [22] | Filed | Apr. 14, 1969 |
| [45] | Patented | June 1, 1971 |

[54] FLUID PRESSURE-SEALED PIPE COUPLING
9 Claims, 3 Drawing Figs.

[52] U.S. Cl. .................................................. 285/96,
285/105, 285/369
[51] Int. Cl. ...................................................... F16l 17/00
[50] Field of Search ........................................... 285/96,
104, 105, 106, 340, 369, 321, 97

[56] References Cited
UNITED STATES PATENTS

| 2,491,004 | 12/1949 | Graham | 285/105 |
| 3,142,500 | 7/1964 | Wesseler | 285/96 |
| 3,420,554 | 1/1969 | Straub | 285/97 |

FOREIGN PATENTS

| 1,490,680 | 6/1967 | France | 285/104 |
| 6,406,152 | 1/1965 | Netherlands | 285/105 |

*Primary Examiner* — Dave W. Arola
*Attorney* — Shanley & O'Neil

ABSTRACT: Pipe coupling includes flexible sealing rings which are pressed into sealing relation with the pipes by pressurized grease injected through fittings in the sidewall of the coupling box. The pressurized grease also actuates pipe grippers which move into gripping relation with the pipe to prevent their extraction from the coupling box. Movement of the pipe grippers compresses resilient rings against retaining walls at the end portions of the coupling box. Upon relief of grease pressure, the seals are broken and the resilient rings automatically release the grippers so the pipes can be extracted from the coupling box.

PATENTED JUN 1 1971

3,582,112

INVENTOR
FRANCISCO A. PICO

BY Shanley & O'Neil

ATTORNEYS

FLUID PRESSURE-SEALED PIPE COUPLING

BACKGROUND OF THE INVENTION

It is essential that coupling devices for joining pipe sections form fluidtight connections. The couplings must also form strong joints, preventing axially directed forces on the pipes from pulling the pipes from the coupling. Further, the couplings should also be capable of quick installation and removal with a minimum amount of physical effort and with simple tools. It is also desirable that the couplings be capable of mass production by simple, inexpensive procedures.

Many forms of pipe couplings have been proposed. However, pipe couplings proposed heretofore have had some disadvantage or deficiency which prevented their being entirely satisfactory, and a need still exists for fluidtight, strong pipe couplings that are cheaply and easily manufactured and can be rapidly installed and removed with little physical effort and with simple tools. A main object of the invention is fulfillment of this need.

Other objects and advantages of the invention will appear from the following detailed description which, together with the accompanying drawings, discloses a preferred embodiment of the invention for purposes of illustration only and not for delineation of the limits of the invention. For definition of the scope of the invention, reference will be made to the appended claims.

BRIEF DESCRIPTION OF THE DRAWINGS

In the drawings, where similar reference characters denote similar elements throughout the several views.

DESCRIPTION OF THE PREFERRED EMBODIMENT

Figure 1:
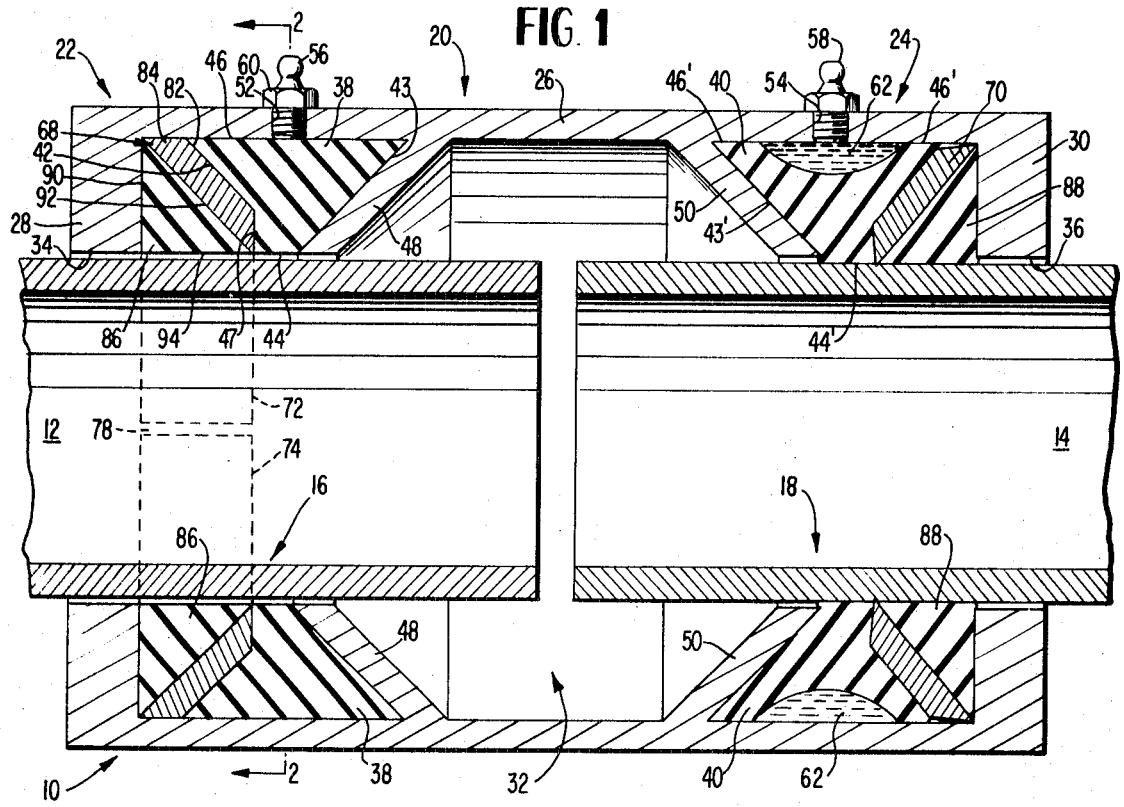
FIG. 1 is a cross-sectional view showing a pipe coupling forming a preferred embodiment of the invention.

In FIG. 1, a coupling generally indicated at 10 is shown joining pipes 12, 14 having axially aligned end portions 16, 18 respectively. Coupling 10 includes a cylindrical coupling box or housing 20 having opposite end portions 22, 24 and a continuous peripheral sidewall 26. Housing 20 includes annular, radially inwardly extending retaining walls 28, 30 at end portions 22, 24 respectively.

The inside surfaces of the housing walls define a cavity 32 within housing 20. Cavity 32 has a radially inner portion which receives pipe end portions 16, 18. The inner portion of cavity 32 has an outer boundary defined generally by the location of cylindrical inner surfaces, 34, 36 of retaining walls 28, 30, respectively. A slight clearance is provided between surfaces 34, 36 and the exterior surfaces of the pipes, to facilitate pipe insertion. The remaining portion of cavity 32 is an annulus located radially outwardly of the pipes, contiguous to housing sidewall 26.

Annular packing or sealing rings 38, 40 are located in the outer portion of cavity 32 at end portions 22, 24 respectively of housing 20. Sealing rings 38, 40 extend around the peripheral sidewall 26 of housing 20, circumscribing the respective pipes. The sealing rings are similar, and description of one imparts an understanding of both. Primed reference characters denote elements of the other ring which correspond to the elements of the ring described.

Sealing ring 38 has a generally V-shaped cross section with converging, sloping inner surfaces 42, 43. Ring 38 has a cylindrical inner surface 44 which effects a seal around pipe 12, and a cylindrical outer surface 46 which opposes the inside surface of housing sidewall 26. A radially extending surface 47 joins surfaces 42, 44.

Rings 38, 40 are spaced from one another, positioned axially along housing sidewall 26 for sealing engagement with the respective pipes. The sealing rings can be made of any suitable flexible sealing material, e.g. rubber or other elastomer.

Spaced-apart packing retaining partitions 48, 50 extend from housing sidewall 26 into the outer portion of the cavity between the sealing rings. The partitions are frustoconical in shape and slope radially inwardly into the housing in a direction away from each other along sloping surfaces 43, 43' of the respective packing rings.

Orifices or passageways 52, 54 are formed in housing sidewall 26 at the respective end portions of housing 20. The walls of the orifices are threaded to mate with threads on conventional grease fittings 56, 58, which are received in the respective passageways. The threaded connection effects a fluidtight seal, but permits rapid removal of each fitting from its passageway. The grease fittings have hexagonal portions, as at 60, which can be gripped by a wrench for unscrewing the fitting.

High-pressure grease is passed through the grease fittings, which have check valve action, into the outer portion of the housing cavity to press the flexible packing rings into sealing relationship with the respective pipes. With grease fittings 56, 58, high pressures (e.g. 7,000—10,000 p.s.i.) can be achieved with an ordinary hand grease gun. An annular mass 62 of confined, high-pressure grease introduced through fitting 58 is shown deforming packing ring 40 radially inwardly so that radially inner surface 44' of the packing ring sealably engages the outer surface of pipe 14. Ring 38 and associated elements at the left of the drawing are depicted as the structure appears before grease is injected.

Coupling 10 includes gripping members 68, 70 which are located at housing end portions 22, 24 respectively, contiguous to the flexible packing rings. The grippers are actuated by pressurized grease acting through the packing rings, and grip the respective pipes to prevent their axial withdrawal from housing 20. Grippers 68, 70 are similar, so description of one imparts understanding of both.

Figure 2:
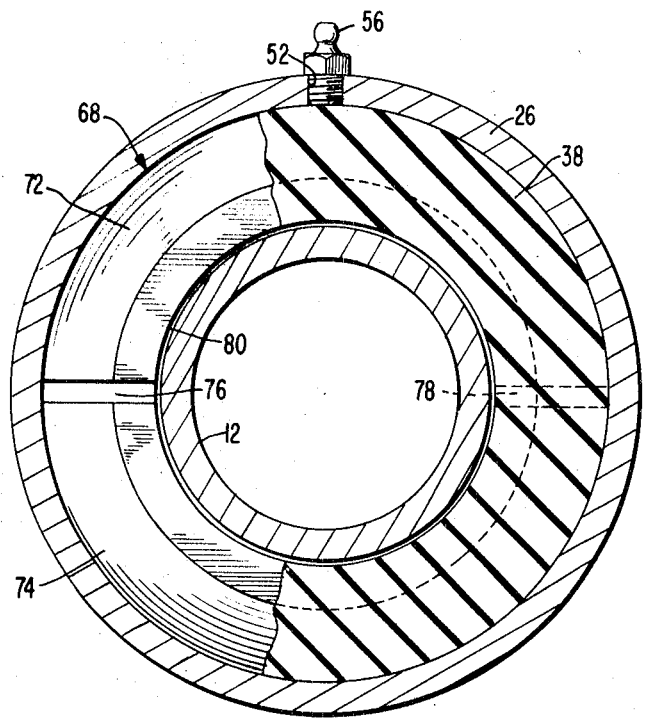
FIG. 2 is a cross-sectional view on line 2-2 of FIG. 1.
Figure 3:
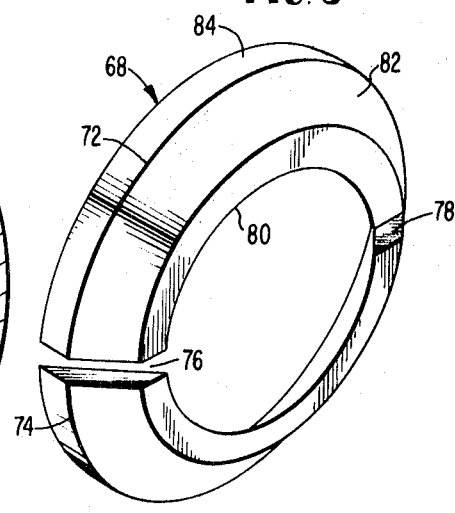
FIG. 3 is a perspective view of details of the structure of FIG. 1.

Gripper 68 is a frustoconical, generally annular member split into two generally semicircular, rigid sections 72, 74 (see also FIGS. 2, 3). Each of the sections 72, 74 has opposite ends in closely spaced-apart relation to the ends of the other section. Gaps 76, 78 thus provided between sections 72, 74 allow the sections to swing into gripping relation with pipe 12 under the pressure of sealing ring 38 from the pressurized grease. The configuration of the inner periphery of gripper 68 conforms to the configuration of pipe 12, and includes a sharp edge 80 which digs into the pipe to effect gripping action. Surface 42 (FIG. 1) of sealing ring 38 slopes in a direction away from housing sidewall 26 and towards sealing ring 40 so that surface 42 can act on a corresponding sloping surface 82 of gripper 68 to effect the swinging movement of the gripper which establishes gripping engagement with pipe 12. Gripper 68 has an outer peripheral portion 84 located at a corner formed by the juncture of housing sidewall 26 and retaining end wall 28.

Grippers 68, 70 are respectively retained in the outer portion of cavity 32 by annular masses or rings 86, 88 of resilient material which are contiguous to the grippers. Each resilient ring is located on a side of a gripper opposite the associated sealing ring, and is contiguous to a housing retaining wall. With this arrangement, each resilient ring is compressed against a retaining wall by the gripper when the gripper is actuated by the pressurized grease and swings into gripping engagement with the pipe. On relief of grease pressure, the resilient rings react against the retaining walls and automatically release the grippers from gripping relation with the pipes by moving the grippers away from the pipes so that the pipes can be extracted from housing 20. The resilient releasing rings are similar, so description of one imparts an understanding of both.

Resilient releasing ring 86 is triangular in cross section, having surfaces 90, 92 in sealed relationship with end wall 28 and gripper 68, respectively when pressure is applied to ring 38 to effect a seal between ring 38 and pipe 12. Normally, portions of surface 46 on opposite sides of the injected grease are in sealed relation with housing sidewall 26, as indicated with surface 46'. However, should pressurized grease force all of surface 46 of sealing ring 38 out of sealed relation with housing sidewall 26, no leakage can occur around the outer periphery 84 of gripper 68 and past releasing ring 86 because of the seals formed by releasing ring 86. Actuation of gripper 68 also presses a surface 94 of releasing ring 86 into sealed relation with pipe 12. Gripper actuation also produces a seal between sealing ring surfaces 42, 43 and 47 and opposing gripper and partition surfaces, to assure a fluidtight joint.

The releasing rings can be made of any suitable resilient material, e.g. rubber or other elastomer, and can be of the same material as the flexible sealing rings since many sealing materials are resilient as well as flexible and since the releasing rings also form seals. However, the releasing rings must have the property of resiliency as well as flexibility, so that they can urge the grippers out of gripping relation with the pipes.

In use, pipe end portions 16, 18 are inserted into coupling housing 20. A grease gun is sequentially connected to each grease fitting to introduce pressurized grease into the outer portion of the cavity to press the sealing rings into sealed relation with the pipes. The pressurized grease also forces grippers 68, 70 into gripping relationship with the pipes, and compresses releasing rings 86, 88. When it is desired to uncouple the pipes, the grease fittings are unscrewed and removed. Pressure in the outer portion of the cavity is relieved by escape of grease through passageways 52, 54. The resilient releasing rings release the grippers from the pipes upon pressure relief, so the pipes can be extracted from housing 20.

Pipe couplings according to the invention are highly advantageous. High sealing pressures can be obtained with ordinary hand grease guns, and even higher pressures can be obtained with mechanically powered grease injectors. The couplings can be quickly installed, and the only tool needed is a grease gun. The couplings can be removed quickly and without special tools, since only a wrench is required to remove the grease fittings. The grippers are actuated by the same force used to effect the seal, and are automatically released by the releasing rings. The couplings are capable of installation and disassembly with little physical labor. The couplings are cheap and easy to manufacture, especially because the parts require no machining. No close tolerances are required because the flexible seals fill any irregularities in the pipe or the coupling structure. Pressure is automatically distributed evenly all around the pipe for a uniform seal.

Although the invention has been described in connection with a preferred embodiment, modifications of the illustrated embodiment can be made without departing from the principles of the invention. Such modifications are within the scope of the appended claims.

I claim:

1. Pipe coupling apparatus, comprising
   a housing including a peripheral sidewall, means defining a cavity in the housing,
   the cavity having an inner portion for receiving aligned end portions of contiguous pipes and having an outer portion contiguous to the sidewall of the housing,
   flexible packing means located in the outer portion of the cavity and extending around the sidewall of the housing,
   fluid-passing means including walls defining a passageway in the sidewall of the housing for passing pressurized fluid into the outer portion of the cavity to press the flexible packing means into sealing relation with the end portions of the pipes,
   gripping means contiguous to the flexible packing means and actuated by the pressurized fluid for gripping the end portions of the pipes, and
   releasing means associated with the housing for urging the gripping means out of gripping relation with the pipes upon liberation of pressurized fluid,
   the housing having opposite end portions,
   the gripping means including a gripping member adjacent each end portion of the housing,
   the releasing means including at least one mass of resilient material contiguous to each gripping member and located on a side of the gripping member opposite the flexible packing means to be compressed by the gripping member upon actuation of the gripping member by the pressurized fluid,
   the housing having an inwardly extending retaining wall at each end portion,
   each mass of resilient material being contiguous to a retaining wall for compression against the retaining wall and reaction against the retaining wall to urge the gripping member in a direction away from the pipes,
   each gripping member having a peripheral portion located at a corner defined by juncture of the sidewall of the housing and a retaining wall, and
   each mass of resilient material having an annular configuration and having surfaces pressed by the gripping member into sealing relation with the retaining wall and with the gripping member upon actuation of the gripping member by the pressurized fluid.

2. Pipe coupling apparatus, comprising a housing including a peripheral sidewall, means defining a cavity in the housing,
   the cavity having an inner portion for receiving aligned end portions of contiguous pipes and having an outer portion contiguous to the sidewall of the housing,
   flexible packing means located in the outer portion of the cavity and extending around the sidewall of the housing,
   fluid-passing means including walls defining a passageway in the sidewall of the housing for passing pressurized fluid into the outer portion of the cavity to press the flexible packing means into sealing relation with the end portions of the pipes,
   gripping means contiguous to the flexible packing means and actuated by the pressurized fluid for gripping the end portions of the pipes, and
   releasing means associated with the housing for urging the gripping means out of gripping relation with the pipes upon liberation of pressurized fluid,
   the housing having opposite end portions,
   the gripping means including a gripping member adjacent each end portion of the housing,
   the releasing means including at least one mass of resilient material contiguous to each gripping member and located on a side of the gripping member opposite the flexible packing means to be compressed by the gripping member upon actuation of the gripping member by the pressurized fluid,
   the packing means including first and second annular sealing rings,
   the fluid-passing means including a separate passageway for each sealing ring,
   the first sealing ring being located at one end portion of the housing for sealing engagement with one of the pipes,
   the second sealing ring being located at the other end portion of the housing for sealing engagement with the other pipe, and
   the housing including at least one inwardly extending retaining partition interposed between the sealing rings.

3. The apparatus of claim 2,
   the housing including two retaining partitions spaced apart along the sidewall of the housing.

4. The apparatus of claim 2,
   each sealing ring having a surface sloping in a direction away from the sidewall of the housing and toward the other sealing ring, and
   each gripping member being contiguous to a sloping surface of a sealing ring for movement into gripping relation with the pipe by pressure of the sealing ring.

5. The apparatus of claim 1,
   each gripping member comprising an annular body including a plurality of sections retained in the outer portion of the cavity by the mass of resilient material, and
   each section having opposite ends in closely spaced-apart relationship with the ends of at least one other section.

6. Pipe coupling apparatus, comprising
a housing including a peripheral sidewall, means defining a cavity in the housing,
the cavity having an inner portion for receiving aligned end portions of contiguous pipes and having an outer portion contiguous to the sidewall of the housing,
flexible packing means located in the outer portion of the cavity and extending around the sidewall of the housing,
fluid-passing means including walls defining a passageway in the sidewall of the housing for passing pressurized fluid into the outer portion of the cavity to press the flexible packing means into sealing relation with the end portions of the pipes,
gripping means contiguous to the flexible packing means and actuated by the pressurized fluid for gripping the end portions of the pipes, and
releasing means associated with the housing for urging the gripping means out of gripping relation with the pipes upon liberation of pressurized fluid,
the releasing means including at least one mass of resilient material contiguous to the gripping means and located on a side of the gripping means opposite the flexible packing means to be compressed by the gripping means upon actuation of the gripping means by the pressurized fluid, and
each mass of resilient material being contiguous to a reaction surface for compression into sealing relation with the reaction surface by the gripping means and for reaction against the reaction surface to urge the gripping means in a direction away from the pipes.

7. The apparatus of claim 6,
the gripping means being retained in the outer portion of the cavity by the resilient material.

8. The apparatus of claim 6,
the fluid-passing means including a fluid injector received in the passageway, and
mounting means mounting the fluid injector for removal for release of pressurized fluid.

9. The apparatus of claim 8,
the fluid injector including a hydraulic lubrication fitting, and
the mounting means including means forming mating threads on the passageway walls and on the hydraulic lubrication fitting.